Aug. 16, 1932.	H. J. BURNISH	1,872,114
METHOD OF AND APPARATUS FOR WELDING PIPE JOINTS
Filed Sept. 13, 1928
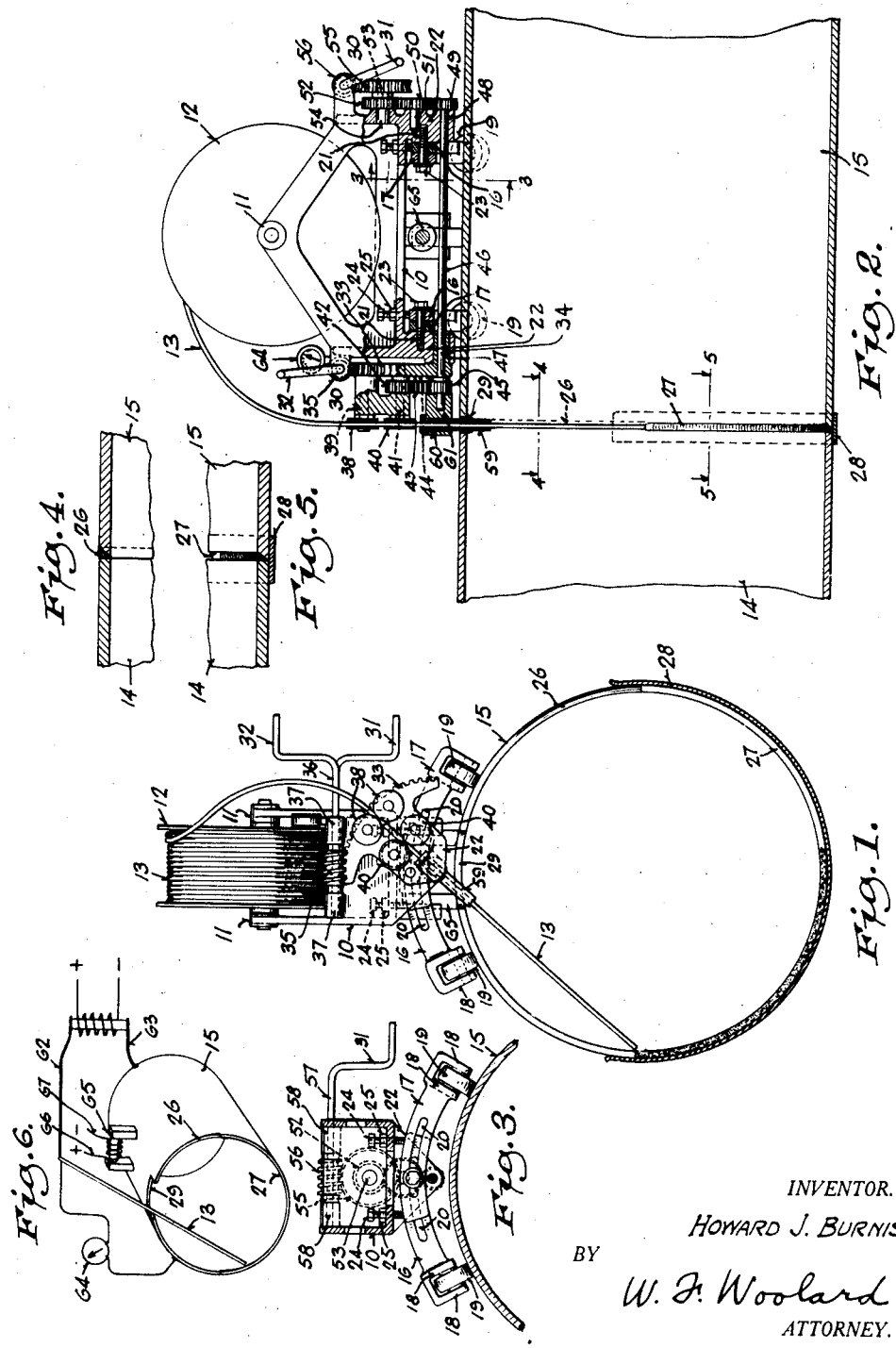
INVENTOR.
HOWARD J. BURNISH
BY
W. F. Woolard
ATTORNEY.

Patented Aug. 16, 1932

1,872,114

UNITED STATES PATENT OFFICE

HOWARD J. BURNISH, OF MILWAUKEE, WISCONSIN, ASSIGNOR TO A. O. SMITH CORPORATION, OF MILWAUKEE, WISCONSIN, A CORPORATION OF NEW YORK

METHOD OF AND APPARATUS FOR WELDING PIPE JOINTS

Application filed September 13, 1928. Serial No. 305,664.

The general object of the invention is to provide a method of and an apparatus for welding the lower portion, or half, of a pipe joint from position above the said lower portion, or half, and at the inner face of the joint, whereby to preclude the necessity for underside welding as heretofore customarily, but more or less unsatisfactorily, practiced in the end to end welding of pipe sections in the field, and to provide a method of welding the whole of the joint from position above the joint, to thus produce a joint of novel structure.

With the above object in view, as well as others which will appear as the specification proceeds, I shall now fully describe a construction in which the features and characteristics of my apparatus have been incorporated and a manner of practicing my method to produce the improved pipe joint, and shall later specifically point out the novelty residing in my invention in claims hereto appended.

In the said drawing:

Figure 1 is an end view of a pipe section and an end elevational view of the apparatus, disclosing said apparatus as when applied to use to weld said pipe section to a different pipe section (not shown).

Fig. 2 is a longitudinal sectional view of adjacent pipe sections to be welded together end to end and a side elevational view, partially sectioned, of the apparatus, the said apparatus being disclosed as applied to use in about the same relation to the pipe sections as in Fig. 1.

Fig. 3 is a detail sectional view, taken as on line 3—3 in Fig. 2.

Fig. 4 is a fragmentary sectional view of the upper portions of the meeting pipe sections, taken as on line 4—4 in Fig. 2, the weld also being shown.

Fig. 5 is a fragmentary sectional view of the lower portions of the meeting pipe sections, taken on line 5—5 in Fig. 2, and disclosing the weld.

Fig. 6 is a wiring diagram disclosing a manner of operatively connecting the apparatus in a welding system, the present view also disclosing the magnet of the apparatus and lead wires from a source (not shown) for energizing the said magnet.

With respect to the drawing and the numerals of reference thereon, 10 represents the frame of the apparatus which includes spaced apart bearings 11 for an ordinary or preferred type of reel 12 carrying welding wire or the like 13.

The frame 10 is adapted to be supported upon and ridable longitudinally along pipe, such as the sections designated 14 and 15. To this end, a pair of oppositely extending preferably arc shaped frame supports 16, 17 are arranged adjacent each end of the frame, and each frame support includes bearings 18 in its outer end by utilization of which rollers 19 are mounted in the frame supports, the arrangement including one roller in each support, and all of the rollers being positioned to be either parallel or in alignment, to ride longitudinally along the pipe. More specifically, the inner end portion of each frame support 16, 17 is provided with an arcuate slot 20 which is concentric with the support, and a screw bolt 21 passes through the parallel and contiguous slots of oppositely extending supports at each end of the frame and enters a downward extension 22 of said frame in such manner that the head 23 of the screw bolt can be made to engage the face of a frame support adjacent said head of the screw bolt to fasten the frame supports 16, 17 in any position to which the slots thereof may have been adjusted with respect to the screw bolts, whereby the rollers 19 can be adjusted at any preferred distance apart to be capable of better or more satisfactorily riding the surfaces of pipe to be welded, as will be readily understood. Downwardly projecting set screws 24 which are threadably situated in the body of the frame 10, two adjacent each end thereof, engage the upper edges of the frame supports 16 and 17 to fix said supports at desired adjusted positions relatively to said frame and to ordinarily situate said frame in a horizontal plane when the rollers 19 are resting upon pipe. Numeral 25 denotes lock nuts for the set screws. See Figs. 1, 2 and 3.

As more clearly disclosed in Figs. 1, 2, 4 and 5, the upper portions of the meeting pipe sections 14 and 15 include a welding groove 26 which is at the external surfaces of the sections and opens either upwardly or approximately horizontally, and the lower portions of the said meeting pipe sections include a welding groove 27 which is at the internal surfaces of the sections and also opens either upwardly or approximately horizontally. In practice, the welding groove 26 will be filled with welding material in any ordinary or preferred manner forming no specific part of the present invention, it being the sole purpose of the present apparatus to supply welding material to the welding groove 27. But my method and article contemplate the arrangement of welding grooves as disclosed. Naturally, the whole of the circumference of the pipe sections at the end to end joint will be supplied with welding material, and, preferably, the ends of the weld made at the grooves 26 and 27, respectively, will overlap a distance to produce a substantial pipe joint insuring a fluid-tight closure. As disclosed, the end of the pipe section 14 is perpendicular to the axis of the said pipe section, while the upper and lower portions of the adjacent end of the pipe section 15 are tapered to provide the welding grooves 26 and 27, although any other convenient arrangement may be employed to provide suitable welding grooves.

A retainer strip 28, which may desirably consist of brass, is preferably fitted about the pipe sections at position beneath and adjacent the location of the lower portion of the joint to form a trough or chill for the welding operation. See Figs. 1, 2 and 5.

In order that the welding wire 13 may be fed to the lower welding groove 27, the upper portion of one or both of the pipe sections 14, 15 is cut away at location above the said welding groove 27 to provide a slot 29 for the passage of said welding wire.

The apparatus includes mechanism, designated generally at 30, for guiding and feeding the welding wire and for oscillating the said wire as it is fed, in order that an arc between the welding wire and the metal of the pipe can be established and maintained in a well known manner, and the metal of the wire can be fused by the arc and deposited into and along the welding groove 27. As disclosed, the mechanism just referred to is manually manipulated and includes two separate and independent operating means, one for feeding the welding wire, actuated by a crank or handle 31, and one for oscillating the said wire, actuated by a crank or handle 32, and the welding wire guiding devices are, at least in part, common to both of the said means, so that the rate of feeding and the rate of oscillating the said welding wire can be relatively varied at will, as is, obviously, desirable, and practically necessary.

Of the means for oscillating the welding wire, 33 is a sector oscillatably mounted, as at 34, upon the downward extension 22 at the forward end of the frame 10 adjacent the welding wire, the said sector extending upwardly from its axis and being meshed with by a worm 35 upon a shaft 36 mounted in bearings 37 in the frame 10 and fixedly carrying the crank 32. Spaced rollers 38, mounted upon the face of the sector opposite the frame, as at 39, and between which the welding wire passes, provide the upper guiding means of the apparatus for the said welding wire.

Of the means for feeding the welding wire, 40 represents lower spaced apart, guiding and feeding rollers between which the welding wire passes. One of the guiding and feeding rollers 40 may be freely rotatable in the sector 33 in any suitable manner, but one is fixed upon a stud 41 rotatably mounted in said sector and fixedly carrying a small gear 42 with which meshes an idler gear 43 mounted upon the sector as at 44. The idler gear 43 is in turn meshed with by a small gear 45 fixed upon a shaft 46 having its forward end portion 47 concentrically mounted in the axis 34 of the sector 33 and its rearward end portion mounted, as at 48, in the rearward extension 22 of the frame 10. The rearward end of the shaft 46 fixedly carries a small gear 49 which is meshed with by an idler gear 50 mounted upon the frame 10, as at 51, and the idler gear 50 is in turn meshed with by a small gear 52 upon a shaft 53 mounted in the frame, as at 54, and fixedly carrying a worm wheel 55 meshed with by a worm 56 upon a shaft 57 mounted in bearings 58 of the frame and fixedly carrying the crank 31.

An additional device for guiding and assisting in the oscillation of the welding wire 13, and for insulating the said welding wire from the pipe sections at the location of the slot 29, consists of a bushing 59, through which the welding wire passes, situated in and oscillatable in the said slot. As more clearly disclosed in Figs. 1 and 2, the bushing 59 is fitted into an opening 60 in a forward extension 61 of the sector 33 and is arranged in alignment with the course of passage of the welding wire between the upper guiding rollers 38 and the lower guiding and feeding rollers 40, beneath the said upper and lower rollers.

In Fig. 6 I have disclosed diagrammatically a manner of operatively connecting the apparatus in a welding system. In said figure, a lead 62, from any suitable source of electrical power, is shown as contacting with the welding wire 13, while a lead 63 from the power source is shown as contacting with the work.

Referring more particularly to Figs. 2 and 6, numeral 64 designates a volt meter connected across the arc and by reference to which the intensity of the arc may be regulated. The arc may be viewed directly through the slot 29, or a periscopic attachment (not shown) may be added for use in the observation of the arc.

A magnet 65, secured upon the frame 10 in any ordinary or preferred manner, is adapted to engage the pipe and to hold the apparatus firmly upon the pipe when the said magnet is energized. See Figs. 1, 2 and 6. Preferably, the magnet is energized from a source separate from the source of the welding current, as indicated by the leads 66 and 67 in Fig. 6.

The manner in which the apparatus functions will be obvious. The rollers 19 may be caused to ride longitudinally along the pipe line while the welding wire and the bushing 59 are withdrawn from the slot 29. Upon alignment of the bushing and welding wire with the slot at a joint to be welded, the said bushing and wire may be inserted through the slot and the crank 32 for oscillating the welding wire may be turned to position said wire at desired angle to start the weld, as, for example, at the angle disclosed in Figs. 1 and 2. Meanwhile, the circuit for energizing the magnet 65 may be closed so that the magnet will rigidly fasten the apparatus in stationary position upon the pipe. Thereafter, the crank 31 may be turned to advance the welding wire into engagement with the wall of the lower welding groove 27, and then turned slightly in reverse direction to strike the arc. With the arc existent, the welding wire is fed toward the welding groove 27 while the metal of the wire is fused by the arc in well known manner and deposited in the said welding groove. To advance the arc along the length of the lower welding groove 27 while the welding wire is being fed toward the groove, the crank 32 is also turned to thus cause the teeth of the sector 33 to ride over the worm 35, in a manner which will be obvious. As the teeth of the sector move ahead over the worm, the sector is rotated upon its axis 34 and the guiding and feeding rollers and the bushing 59, naturally, move as a unit with the said sector. At the end of a rotative movement carrying the welding wire to the opposite end of the lower welding groove 27, the direction of rotation of the crank 32 is reversed, if more than a single layer of welding material is to be deposited in the welding groove, and the welding wire is thus caused to move in opposite direction along the length of the welding groove while the welding wire is still being fed and the arc is still existent, as will be understood.

It will be evident that the rate of feeding of the welding wire and the rate at which the said wire is caused to move along the length of the part-circular welding groove 27 can be relatively varied at will, and that the layer of welding material deposited can be of any desirable depth or thickness. By reference to the volt meter 64 the intensity of the arc can be maintained approximately constant, and the condition of the weld can be ascertained by looking directly through the slot 29, or by utilization of a periscopic attachment as hereinbefore referred to but not disclosed.

The welding wire 13 may be made to traverse any desired portion of the circumference of the pipe. As disclosed, the said welding wire transverses a little more than the lower half of the said circumference, and the weld made in the upper welding groove 26 preferably overlaps the weld made in the lower welding groove 27 in order that the two welds together will provide a substantial and fluid-tight joint between the pipe sections 14 and 15. At the finish of the welding operation in the groove 27 the trough or chill 28 is desirably removed. The slot 29 in the top portion of the pipe is plugged by fusing metal of a welding electrode thereinto, or by inserting and welding a filler piece into said slot.

It has been stated that the small gear 45 is fixed upon the shaft 46 concentrically mounted in the axis 34 of the sector 33. So that, as the said sector is caused to oscillate, the idler gear 43, in mesh with the small gear 45, and the small gear 42, in mesh with the idler gear, rotate as a unit with the sector without disturbing the drive for the guiding and feeding rollers 40 through the said small gear 45, idler gear 43, and small gear 42, as will be understood.

Having thus described my invention, what I claim and desire to secure by Letters Patent of the United States, is:

1. The method of accomplishing end to end welding of pipe sections, which consists in placing adacent ends of upper and lower portions of different pipe sections in contiguous relation, providing a passage past an upper portion of a pipe section leading to the inner surfaces of said lower portions to admit a welding tool, applying fused welding material to said inner surfaces along the meeting line of the said lower portions of said different pipe sections, applying fused welding material to said outer surfaces along the meeting line of the said upper portions of said different pipe sections, and causing the inner and outer welds to together extend throughout the circumference of the pipe sections.

2. The method of accomplishing end to end welding of pipe sections, which consists in placing adjacent ends of upper and lower portions of different pipe sections in contiguous relation, providing a welding groove at the meeting line of the said upper portions adjacent the outer surfaces thereof, providing a welding groove at the meeting line of the said lower portions adjacent the inner surfaces thereof, providing a passage past an upper portion of a pipe section leading to the inner surfaces of said lower portions to admit a welding tool, applying fused welding material along said welding groove at the inner surfaces of said different pipe sections, applying fused welding material along said welding groove at the outer surfaces of said different pipe sections, and causing the inner and outer welds to together extend throughout the circumference of the pipe sections.

3. An apparatus for welding the lower portion of a pipe joint from position above the said lower portion and at the inner face of the joint, comprising a welding electrode adapted to be inserted into pipe sections at location in proximity to the inner surfaces of meeting lower portions of adjacent ends thereof, mechanism for feeding said welding electrode into engagement with a lower portion of a pipe section and for withdrawing said electrode from said lower portion to strike an arc, said feeding mechanism being adapted to thereafter feed said electrode toward said lower portions while the arc is existent to fuse welding material of said electrode, and mechanism operable independently of said feeding mechanism for moving said welding electrode circumferentially of said pipe sections while the arc is existent, to thus cause fused welding material of said electrode to be applied to the inner surfaces of said pipe sections along the line of the meeting ends of said lower portions.

4. An apparatus for welding the lower portion of a pipe joint from position above the said lower portion and at the inner face of the joint, comprising a welding electrode adapted to be inserted into pipe sections at location in proximity to the inner surfaces of meeting lower portions of adjacent ends thereof, mechanism for feeding said welding electrode into engagement with a lower portion of a pipe section and for withdrawing said electrode from said lower portion to strike an arc, said feeding mechanism being adapted to thereafter feed said electrode toward said lower portions while the arc is existent to fuse welding material of said electrode, mechanism operable independently of said feeding mechanism for moving said welding electrode circumferentially of said pipe sections while the arc is existent, to thus cause fused welding material of said electrode to be applied to the inner surfaces of said pipe sections along the line of the meeting ends of said lower portions, and a volt meter connected across said arc indicative of the intensity thereof.

5. An apparatus for welding the lower portion of a pipe joint from position above the said lower portion and at the inner face of the joint, comprising a welding electrode adapted to be inserted into pipe section at location in proximity to the inner surfaces of meeting lower portions of adjacent ends thereof, a frame supporting said welding electrode and adapted to be supported upon a pipe section, mechanism carried by the frame for feeding said welding electrode into engagement with a lower portion of a pipe section and for withdrawing said electrode from said lower portion to strike an arc, said feeding mechanism being adapted to thereafter feed said electrode toward said lower portions while the arc is existent to fuse welding material of said electrode, mechanism on said frame operable independently of said feeding mechanism for moving said welding electrode circumferentially of said pipe sections while the arc is existent, to thus cause fused welding material of said electrode to be applied to said inner surfaces of said pipe sections along the line of the meeting ends of said lower portions, rollers upon said frame and ridable along the pipe sections, and an electro-magnet fixed to said frame and adapted when energized to engage a pipe section to hold said frame in stationary position upon said pipe section.

6. In an apparatus of the character described, a frame, a welding electrode supported thereon, means on said frame for feeding said electrode, said means comprising feeding and guiding rollers, a manually manipulable member, and a gearing connection between said member and said feeding and guiding rollers, and means on said frame operable independently of said feeding means for imparting oscillatory movement to the guided portion of said electrode, said last mentioned means comprising a sector rotatably mounted on said frame, said sector supporting a guide for said electrode and a part of the gearing connection of the feeding means, a worm meshing with said sector, and a manually manipulable member for rotating said worm.

7. In an apparatus of the character described, a frame, a welding electrode supported thereon, means on said frame for feeding said electrode, said means comprising feeding and guiding rollers, a manually manipulable member, and a gearing connection between said member and said feeding and guiding rollers, means on said frame operable independently of said feeding means for imparting oscillatory movement to the guided portion of said electrode, said last mentioned means comprising a sector rotatably mounted on said frame, said sector supporting a part of the gearing connection of the feeding means, a worm meshing with said sector, and a manually manipulable member for rotating said worm, and an insulating and guiding bushing for said electrode upon said sector and in alignment with the course of passage of said welding electrode past said feeding and guiding rollers.

In testimony whereof, I have signed my name at Milwaukee, this 11 day of September, 1928.

HOWARD J. BURNISH.